UNITED STATES PATENT OFFICE.

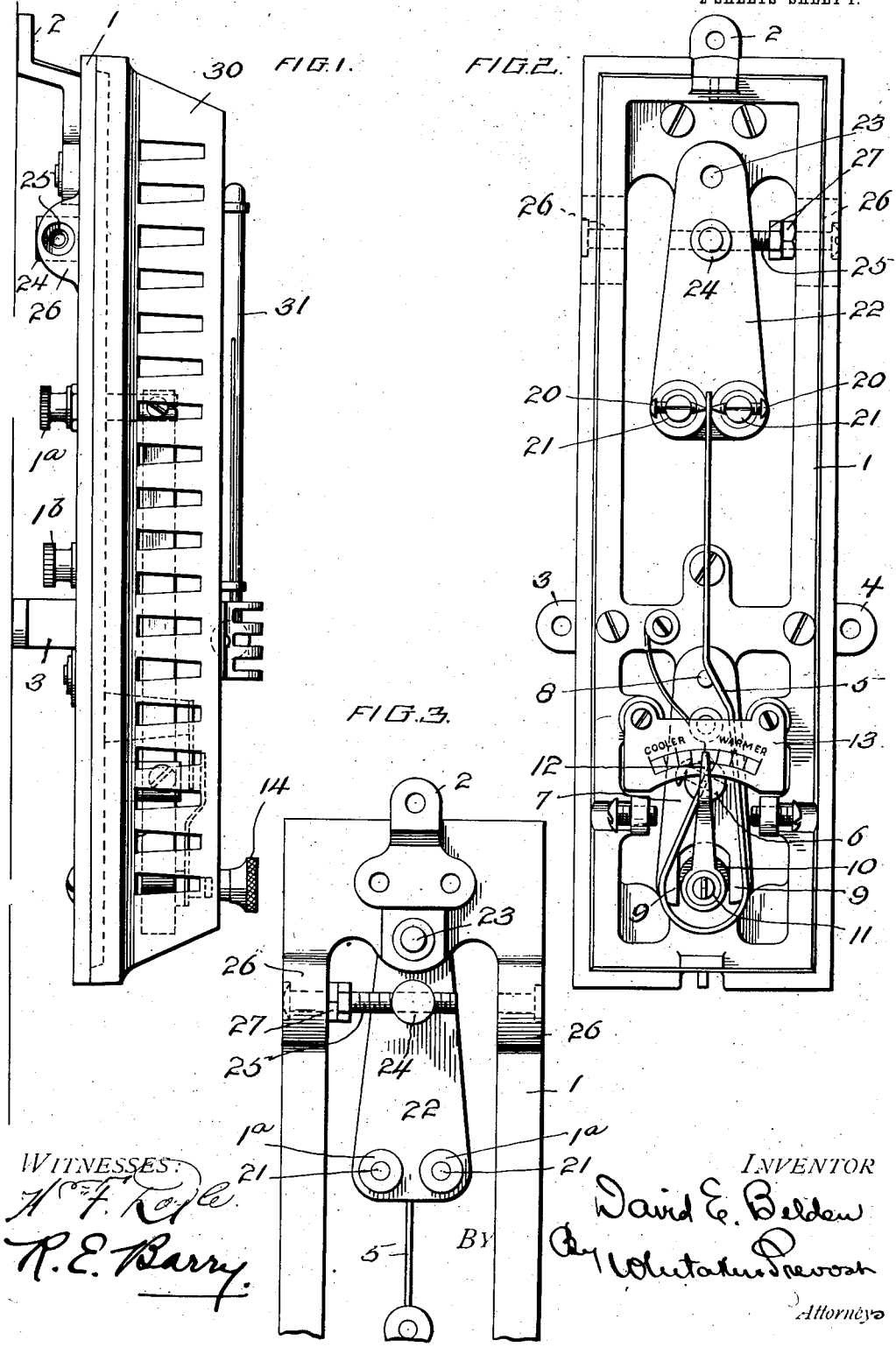

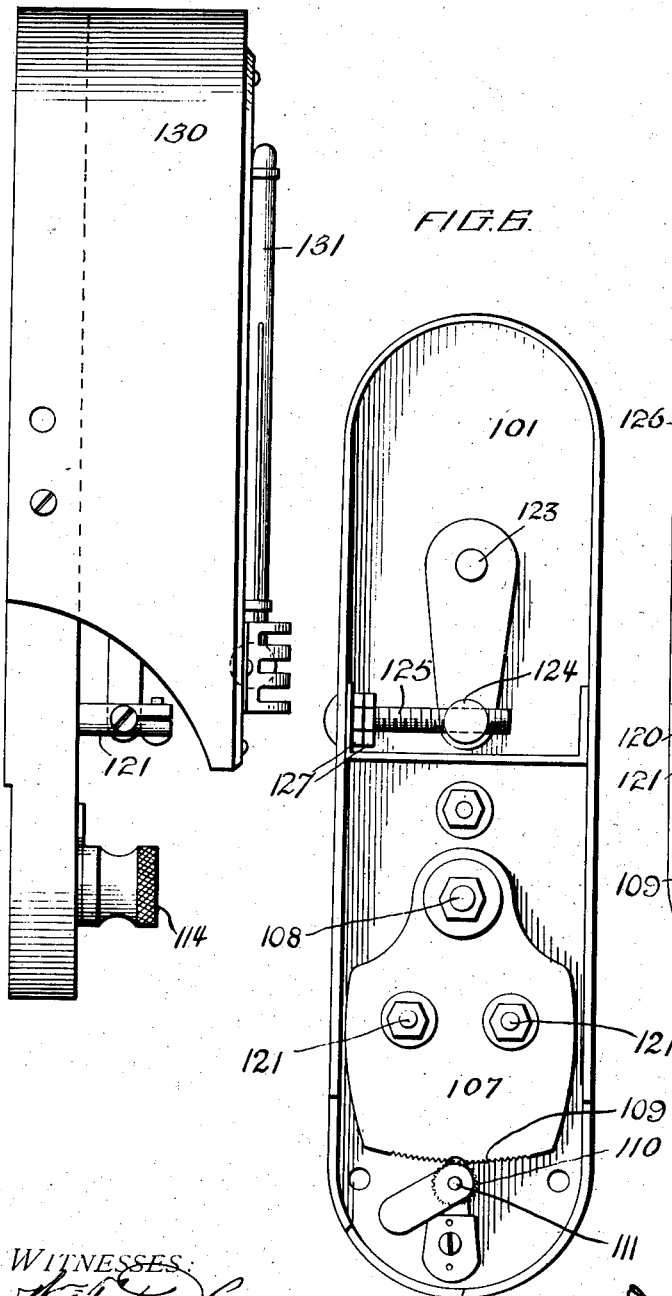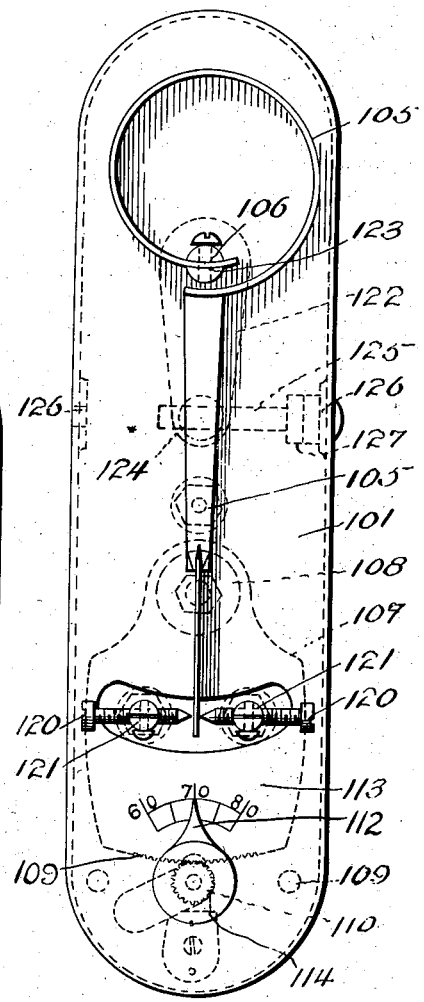

DAVID E. BELDEN, OF AUBURN, NEW YORK, ASSIGNOR TO THE JEWELL MANUFACTURING COMPANY, OF AUBURN, NEW YORK, A CORPORATION OF NEW YORK.

THERMOSTAT.

1,048,277.  Specification of Letters Patent.  Patented Dec. 24, 1912.

Application filed June 29, 1911. Serial No. 636,000.

*To all whom it may concern:*

Be it known that I, DAVID E. BELDEN, citizen of the United States, residing at Auburn, in the county of Cayuga and State of New York, have invented certain new and useful Improvements in Thermostats; and I do hereby declare the following to be a full, clear, and exact description of the invention, such as will enable others skilled in the art to which it appertains to make and use the same.

My invention consists in the novel features hereinafter pointed out, reference being had to the accompanying drawings which illustrate two embodiments of my invention selected by me for the purpose of illustrating the same, and the invention is fully disclosed in the following description and claims.

Referring to the said drawings, Figure 1 represents a side elevation of a thermostat of the type in which a movement of the thermostatic element with respect to normally stationary contacts, is effected by hand adjusting mechanism for the purpose of changing the indicated temperature at which the said element will operate, said thermostat having my invention embodied therein. Fig. 2 is a front view of the thermostat shown in Fig. 1 with the screen or casing removed. Fig. 3 is a rear elevation of a part of the thermostat shown in Figs. 1 and 2. Fig. 4 is a side elevation of a thermostat of the type in which a movement of the circuit contacts with respect to a normally stationary thermostatic element is effected by the hand adjusting devices to change the indicated temperature at which the device will operate and having my invention embodied therein. Fig. 5 is a front view of the same with the screen or cover removed. Fig. 6 is a rear elevation of the device shown in Figs. 4 and 5.

In the use of a thermostat it is necessary in order to secure satisfactory action of the instrument that the device shall be in accurate adjustment with a thermometer so that if it is set so that the thermostatic element will change the circuits at say 70° F., it will actually perform this function when the temperature of the surrounding media in which it is used, be it air or other material, reaches the designated degree, as indicated by a standard thermometer. While this is desirable in all thermostats it is particularly desirable in the thermostats used in connection with systems of house or room temperature regulation, in which the parts are very nicely adjusted so as to operate on a change of one degree or less, with a view of maintaining the desired temperature. The adjustment of a thermostat to bring it into harmony with thermometric indications is performed by the parties who manufacture, sell and install the instruments, and it frequently happens that a thermostat which is in perfect adjustment with thermometric indications becomes deranged in shipment and must be readjusted at the time of installation. It also frequently happens that after a thermostat is installed, it becomes out of harmony with thermometric indications, by reason of a jar, or other accidental causes and necessitates readjustment. This adjustment is usually performed by experts, familiar with the instruments by resetting the contact screws, or manipulating the thermostatic element if it has become bent, and is an operation beyond the skill of the ordinary householder, or user of thermostats.

The object of my invention is to provide means for easily and quickly adjusting a thermostat to bring it into harmony with a thermometer, which, while it will facilitate the adjustment of the same by experts or others in installing and operating the devices, shall yet be of such a simple character that it can be used by any ordinary householder at any time without removing the thermostat from the wall or other supporting surface, and by means of a screw driver or other simple tool. The adjusting means here referred to is entirely distinct from and independent of the hand adjustment usually provided for changing the indicated temperature which the thermostat is desired to maintain, or at which the thermostatic element will shift from one contact to the other to make or break the electric circuits controlled by it, and must not be confounded with such hand adjustment.

In Figs. 1, 2 and 3 I have shown a thermostat of well known type having my invention embodied therein. In these figures 1 represents the main frame of the instrument which is provided with means for attaching it to a wall or other supporting surface. This frame is ordinarily secured directly upon a wall, by suitable screws, but I prefer to provide the said frame with offsets or brackets, as shown at 2, 3, 4 extending rearwardly from the frame and provided with apertures for the retaining and supporting screws, so that the frame will be held at a short distance from and parallel to the wall or supporting surface. This provides a better circulation of air all around the thermostatic element and also permits the instrument to be wired from the back by means of rearwardly projecting binding posts $1^a$, $1^a$, $1^b$ thus permitting the instrument to be installed without removing the case or screen.

5 represents the thermostatic element, which is made of any preferred or suitable material or materials, usually of two strips of sheet metal having different units of expansion. In this type of device, in which the thermostatic element is moved by the hand adjusting mechanism, the said element is rigidly secured to a post 6, carried by a plate 7 pivoted at its upper end at 8 to the frame 1, and having its lower end bifurcated to form arms 9, 9 which are engaged by a rotary cam 10 secured to a spindle 11 rotatably mounted in the frame 1.

The spindle 11 carries a pointer 12 which plays over a scale 13 on which is marked a scale of degrees corresponding to thermometric indications, the central indication in this instance corresponding with 70° F. and the indications on either side being spaced to correspond with variations of 5° from each other. The words "Cooler" and "Warmer" are also printed on the scale here shown. The spindle 11 is provided with knurled thumb piece or button 14, for turning the spindle and cam, said thumb piece being preferably detachable from the spindle to facilitate the removal of the screen which can be thus provided with an aperture smaller than the head of the button or thumb piece, and of sufficient size merely to permit the passage of the spindle.

20, 20 represent the electric contact screws supported on opposite sides of the thermostatic element and preferably so closely thereto that a variation of a degree of temperature or less above or below the temperature indicated by the pointer 12 will cause the element 5 to move from one contact to the other. The contacts 20, 20 are carried by posts 21, 21 connected with binding posts $1^a$, $1^a$ and rigidly mounted on a plate 22, which is pivoted to the frame 1, at 23, and carries a lug 24 projecting (in this instance) to the rear of said plate and provided with a threaded aperture engaged by the setting or adjusting screw 25, which passes loosely through a part connected with the frame, and is held from longitudinal movement with respect to the frame. In the present instance the screw passes through a lug 26 projecting rearwardly from the frame, and is provided with a head engaging the lug on one side and a fixed collar (formed in this instance by the set nuts 27, 27) engaging the other side of the lug. I prefer to provide the frame work with two lugs 26 one on either side, so that the adjusting or setting screw may be located at either side of the thermostat, to accommodate different situations where the apparatus is installed as on the right or left side of a door casing having projecting wood work which might interfere with the operation of the screw, from one side or the other.

30 represents a screen inclosing the apparatus and secured to the main frame in any desired manner, and 31 represents a thermometer which is usually attached to the screen above the scale 13. The screen is in this instance provided with a suitable aperture through which the scale 13 can be seen.

In using the instrument constructed as just described, the proper adjustment of the thermostat to harmonize it with the thermometric indications will ordinarily be made at the factory in the usual manner, so that the scale 13 will correspond with the scale of the thermometer, the plate 22 being held rigidly in a central or median position. Should the thermostat get out of harmony with the thermometer before installation or at any time thereafter, it may be easily and quickly restored to accurate adjustment by slightly turning the screw 25, without removing the casing or detaching the instrument from the wall or in any way interfering with the electric connections.

Let it be supposed that this instrument is installed in a house and electrically connected with the battery and motor of a damper controlling apparatus, such for example as is illustrated in U. S. Letters Patent granted to C. E. Jewell, No. 774,882, dated Nov. 15, 1904 and let it be supposed that owing to a jar, or other accidental circumstance, the delicate thermostatic element has been thrown out of adjustment so that when the pointer of the hand regulating device stands at 70 on the scale 13, the device operates at actual thermometric temperatures above and below 80° F., as indicated by the thermometer. In such case obviously the thermostatic element has been bent to the left (Fig. 2) and with the ordinary thermostat it would be necessary to remove the case and painstakingly readjust the contact screws 20, 20 separately. With a device embodying my invention it is only necessary to set the pointer on scale 13 to indicate the degree of temperature indicated by the thermometer at the moment the adjustment is made, and then by means of an ordinary screw driver (or special tool as preferred) to rotate the screw 25 so as to swing the plate 22 and contacts 20 to the left until the desired adjustment is secured. As the plate is moved to the left as soon as a point fractionally above the correct adjustment is reached the thermostatic element which in the case supposed will be in engagement with the left hand contact 20, will be released thereby and engaged by the right hand contact 20, which will operate the motor and dampers, and indicate to the operator or householder that the approximate adjustment has been reached. This position of the apparatus would be sufficiently accurate for ordinary purposes but if a finer adjustment is desired the screw 25 can be turned backward sufficiently to cause the disengagement of the element 5 from the right hand screw, without causing an engagement with the left hand screw, when the device will be in absolute adjustment. It is not necessary to see the set screws to ascertain whether or not they are in contact with the blade as the operation of the motor and dampers will give an audible indication thereof, as will be readily understood.

In Figs. 4, 5 and 6 I have shown for purposes of illustration, my invention embodied in a thermostat of the type wherein the thermostatic element is normally held rigid and the hand adjustment is effected by moving the contacts with respect thereto. In these figures 101 represents the base, and 105 is the thermostatic element which is rigidly secured at one end to a post 106, which in this instance is mounted on a plate 122 pivoted to the frame at 123. This plate carries a lug 124 having a threaded aperture engaged by the setting screw 125, which extends through one of two apertures 126 in a rearwardly extending flange of the frame, and is provided with the usual head on one side of said flange and with a fixed collar on the other side formed by the set nuts 127.

The contact screws 120 are carried by posts 121 secured to a plate 107, pivoted to the frame at 108 and having a gear segment 109 at its lower edge meshing with a pinion 110 on a rotatable spindle 111, which also carries pointer 112 swinging over a scale 113, and a thumb piece 114 for turning said spindle, pointer and pinion. The posts 121 extend through a slot in the frame of sufficient size to permit the movement of the plate 107. 130 is the screen, carrying the thermometer 131.

It will be readily seen that this construction is the converse of that shown in Figs. 1, 2 and 3 and the setting of the device in harmony with thermometric indications is accomplished by means of a screw 125 in exactly the same manner as that previously described except that the screw changes the relation of the element 105 with respect to the contacts 120 in this case.

It will be readily understood that my invention is capable of being embodied in other forms than those herein shown which I have selected for purposes of illustration, and that it may be applied to thermostats of other types than those herein shown and in which the setting mechanism may be varied according to the construction of the apparatus to which it is applied to effect, when desired, an adjustment of the relative positions of the thermostatic element and the electric contacts which coöperate therewith.

What I claim and desire to secure by Letters Patent is:—

1. In a thermostat, the combination with a main supporting frame, of a thermostatic element movably secured to the frame, and provided with an electric contact device, a part movable with respect to the frame, contacts carried thereby coöperating with the contact of said thermostatic element, a main adjusting device operatively connected with one of said movable parts for causing the thermostat to operate at different predetermined temperatures, and an auxiliary adjusting mechanism connected with the other of said movable parts, for adjusting the same with respect to the frame to harmonize the instrument with thermometric indications.

2. In a thermostat, the combination with a main supporting frame, of two supporting plates connected movably with respect to said frame, a thermostatic element carried by one of said plates, a pair of contacts adapted to coöperate with the thermostatic element, carried by the other of said plates, a main adjusting device operatively connected with one of said plates, for causing the thermostat to operate at different predetermined temperatures, and an auxiliary adjusting device connected with the other of said plates, for adjusting it and the part or parts carried thereby with respect to the frame to harmonize the instrument with thermometric indications.

3. In a thermostat, the combination with a main supporting frame, of two supporting plates connected movably with respect to said frame, a thermostatic element carried by one of said plates, a pair of contacts adapted to coöperate with the thermostatic element, carried by the other of said plates, a main adjusting device operatively connected with one of said plates, for causing the thermostat to operate at different predetermined temperatures, an adjusting screw connecting said frame and the other of said plates for adjusting said plate in both directions longitudinally of the screw and holding it rigidly at all times in its adjusted position.

4. In a thermostat, the combination with the main frame of a member comprising a thermostatic element, a member comprising contacts coöperating with said thermostatic element, a main adjusting device connected with one of said members for causing the thermostat to operate at different predetermined temperatures, an auxiliary adjusting screw interposed between the other of said members and the main frame, for harmonizing the instrument with thermometric indications, said screw having a threaded engagement with one of said parts and an engagement with the other preventing the longitudinal movement of the screw with respect thereto, whereby said screw holds its engaged parts rigidly in adjusted position.

5. In a thermostat, the combination with a thermostatic element, contacts supported in coöperative relation therewith, and a main adjusting mechanism for altering the relation of the said thermostatic element with respect to said contacts, to cause it to operate at different predetermined temperatures, of an auxiliary adjusting mechanism for changing the relative positions of the thermostatic element and said contacts to harmonize the instrument with thermometric indications, without disturbing the said main adjusting mechanism, nor the adjustment of the individual contacts with respect to their supporting means, and means provided on the thermostat frame for arranging said auxiliary adjusting mechanism so that it is accessible at one side of the frame, or the other, as desired.

6. In a thermostat, the combination with a thermostatic element, contacts supported in coöperative relation therewith, and a main adjusting mechanism for altering the relation of the said thermostatic element with respect to said contacts, to cause it to operate at different predetermined temperatures, of an auxiliary adjusting mechanism for changing the relative positions of the thermostatic element, and said contacts to harmonize the instrument with thermometric indications, without disturbing the said main adjusting mechanism nor the adjustment of the individual contacts with respect to their supporting means, said auxiliary adjusting mechanism comprising a screw, engaging a part connected with the frame and the said normally fixed part and having a threaded engagement with one of said parts and means for preventing the longitudinal movement of the screw with respect to the other of said parts, said frame being provided with a screw engaging part at each side, whereby the adjusting screw may be located at either side of the instrument.

7. In a thermostat, the combination with a main frame, of a thermostatic element movably mounted in respect to said frame, a plate movably secured to the frame contacts adapted to coöperate with the thermostatic element, carried by said movable plate, a main adjusting mechanism connected with said thermostatic element for causing the thermostat to operate at different predetermined temperatures, and an auxiliary adjusting screw connecting the frame with the said movable plate to adjust said plate and the contacts carried thereby with respect to the thermostatic element to harmonize the instrument with thermometric indications.

8. In a thermostat, the combination with a frame, of a thermostatic element movably mounted on the frame, a plate pivotally secured to said frame, normally fixed contacts mounted on said plate in coöperative relation with said thermostatic element, a main adjusting mechanism connected with the thermostatic element for changing the relation of said element with said contacts, and an auxiliary adjusting screw, engaging said frame and said pivoted plate, for adjusting said plate and contacts laterally to harmonize the thermostat with thermometric indications, said screw having an operating part accessible to an operator without removing any part of the mechanism.

9. In a thermostat, the combination with a frame, provided with rearwardly projecting offsets for engaging a supporting surface, and holding the frame away from the same, a thermostatic element supported by said frame, contacts supported by said frame in coöperative relation with said element, said contacts and the thermostatic element being the one in normally fixed and the other in movable relation with said frame, a main adjusting mechanism for varying the relation of said contacts with said element and connected with the movable part or parts, a lug on said frame projecting rearwardly therefrom, and an adjusting screw engaging said lug and said normally fixed part for harmonizing the thermostat with thermometric indications.

In testimony whereof I affix my signature, in the presence of two witnesses.

DAVID E. BELDEN.

Witnesses:
EDWARD G. WICKES,
C. D. FOWLER.